United States Patent [19]

Akagawa

[11] Patent Number: 4,911,490

[45] Date of Patent: Mar. 27, 1990

[54] GRIPPER ASSEMBLY

[75] Inventor: Minoru Akagawa, Fremont, Calif.

[73] Assignee: Intelmatec Corporation, Fremont, Calif.

[21] Appl. No.: 257,230

[22] Filed: Oct. 13, 1988

[51] Int. Cl.$^4$ .......................... B25J 15/08; B25J 19/02
[52] U.S. Cl. ....................................... 294/88; 294/116; 294/907; 901/37; 901/47
[58] Field of Search ...................... 294/95, 97, 116, 88, 294/907, 66.2, 86.4, 86.41, 115; 901/47, 37, 29, 31, 32, 36, 39, 45

[56] References Cited

U.S. PATENT DOCUMENTS

| 2,800,355 | 7/1957 | Vinner et al. | 294/88 |
| 3,012,811 | 12/1961 | Sandrock | 294/116 |
| 3,108,835 | 10/1963 | Rowekamp | 394/88 |
| 3,163,401 | 12/1964 | Johnston et al. | 294/116 |
| 3,386,297 | 6/1968 | Willis | 294/88 |
| 4,211,123 | 7/1980 | Mack | 901/37 |
| 4,340,249 | 7/1982 | Bucklew | 294/95 |

FOREIGN PATENT DOCUMENTS

| 4964 | 1/1978 | Japan | 294/66.2 |
| 9068 | 11/1980 | U.S.S.R. | 294/66.2 |

Primary Examiner—Johnny D. Cherry
Attorney, Agent, or Firm—Flehr, Hohbach, Test, Albritton & Herbert

[57] ABSTRACT

A gripper assembly contains within its cylindrical tubular housing a piston and a rotatably supported finger assembly having a push rod and gripper fingers. The push rod is pressed rotatably against the piston through a thrust bearing by a spring. As the piston pushes the push rod against the biasing force of the spring, the motion of the push rod causes the gripper fingers to close. Position of the object to be gripped can be detected through a fiber optic light guide passing through the piston and the push rod.

3 Claims, 1 Drawing Sheet

GRIPPER ASSEMBLY

BACKGROUND OF THE INVENTION

This invention relates to an improved gripper assembly for gripping and picking up small objects by mechanical fingers.

Robots and other apparatus for handling objects of all types are commonly used in automated production and other processes. It is therefore desirable, for example, to be able to pick up small objects by mechanical fingers but prior art grippers are complicated, bulky and of limited capabilities. For example, prior art gripping fingers are not adapted to freely rotate after picking up an object and frequently require an accessory apparatus to accurately locate the object to be picked up.

SUMMARY OF THE INVENTION

It is therefore an object of the present invention to provide an improved gripper assembly which is compact and versatile and with which even a rotating object can be accurately gripped.

The above and other objects of the present invention can be achieved by providing a gripper assembly having within its cylindrical tubular housing a piston and a rotatably supported finger assembly. The finger assembly has a push rod which is pressed against the piston by a spring and makes a mutually rotatable contact with the piston through a thrust bearing. Rotatably supported gripper fingers have sloped contact surfaces and as the push rod is pressed by the piston, it presses these sloped surfaces outwards to cause the other ends of the fingers to move towards each other to pick up a target object. A fiber optic light guide connected to an optical sensor is passed thorugh the piston and the push rod such that the target object can be located accurately.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF PREFERRED EMBODIMENT

Figure 2:
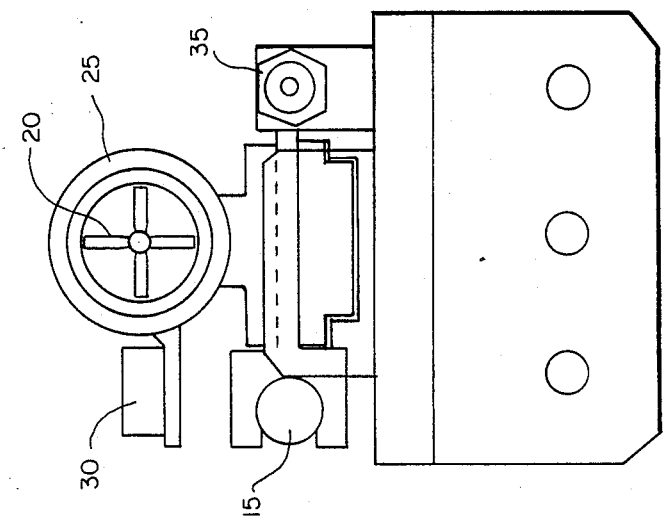
FIG. 2 is a bottom view of the gripper assembly of FIG. 1.
Figure 1:
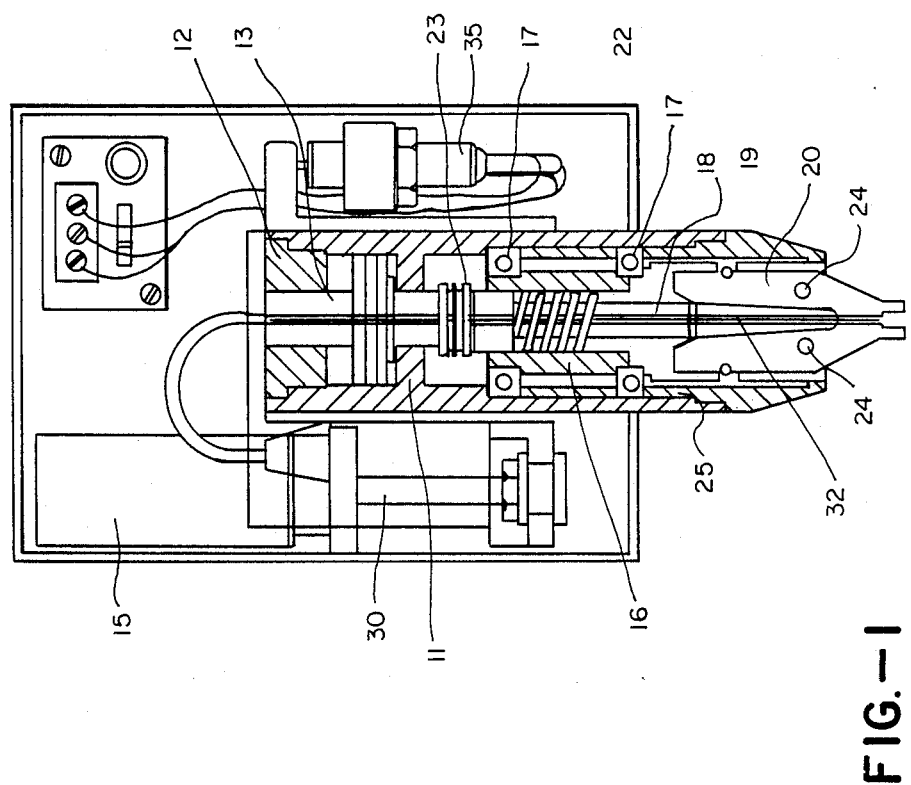
FIG. 1 is a sectional front view of a gripper assembly embodying the present invention.

A gripper assembly embodying the present invention is described below in detail with reference both to FIG. 1 which is its sectional view and FIG. 2 which is its bottom view. Numeral 11 indicates a housing which comprises a cylindrical tube with one end (top end) closed with a top cover 12. The top cover 12 has a central hole penetrating therethrough with an O-ring provided on its internal surface such that a piston 13 disposed longitudinally along the axis of the cylinder can be slidingly moved therethrough by air from an air cylinder 15 provided outside the housing 11.

Inside the housing 11, there is a tubular sleeve 16 supported coaxially therewith and rotatably around the central axis thereof. Numeral 17 indicates ball bearings provided between the inner wall of the housing 11 and this tubular sleeve 16 such that the tubular sleeve 16 is freely rotatable with respect to the cylindrical housing 11. A push rod 18 is disposed inside this sleeve 16, extending along the central axis of the sleeve 16, and hence also of the cylindrical housing 11. The lower end (distal from the top cover 12) of the sleeve 16 is connected to a finger housing 19 which is also coaxially tubular and its lower part encloses four gripper fingers 20 which operate like fingers to grip objects.

The top end (closer to the top cover 12) of the finger housing 19 serves as the seat of a compression spring 22 by the biasing force of which the push rod 18 is pressed against the lower end of the piston 13 through a thrust bearing 23 such that the piston 13 and the push rod 18 can freely rotate with respect to each other. The four gripper fingers 20 are each identically shaped and generally elongated in the axial direction. They are disposed symmetrically around the central axis of the housing 11 and supported rotatably by the finger housing 19 around dowel pins 24 which extend perpendicularly to the axial direction. The lower ends of the gripper fingers 20 are extended generally in the axial direction and their upper ends are sloped and in contact with the lower end of the push rod 18 such that a downward motion (away from the top cover 12) of the piston 13 is directly communicated to the push rod 18 and the corresponding downward motion of the push rod 18 has the effect of moving the upper parts of the gripper fingers 20 outward away from each other. Since the gripper fingers 20 are rotatably supported around the dowel pins 24 which are perpendicular to the axial direction, this has the effect of causing the lower ends of the gripper fingers 20 to move inward towards the central axis of the cylindrical housing 11 and hence towards each other. Numeral 25 indicates a tubular bottom cover adapted to be screwed onto the housing 11 to generally envelope the finger housing 19 and the sleeve 16.

Numeral 30 indicates an optical sensor. The piston 13, the thrust bearing 23 and the push rod 18 are all provided with a hole at the center and a fiber optic light guide 32 connected to the optical sensor 30 is passed therethrough, the other end thereof reaching a position near the lower end of the gripper fingers 20 such that the position of a target object to be gripped by the gripper fingers 20 can be accurately detected by the optical sensor 30. Numeral 35 indicates a touch sensor which may be of a type disclosed, for example, in U.S. Pat. No. 4,734,549 for accurately positioning the gripper assembly. A computer or the like for receiving output signals from this touch sensor 35 is not shown in FIGS. 1 and 2.

Advantages of the gripper assembly embodying the present invention include its ability to grip even a rotating object because the gripper fingers 20 are freely rotatably with respect to the housing 11. Because it is provided with an optical sensor and a light guide which extends to the lower extremity of the assembly, the position of the object to be gripped can be accurately ascertained. Although the present invention has been described above by way of only one embodiment, the disclosure is intended to be construed broadly. Any modifications and variations that may be apparent to a person skilled in the art are intended to be included within the scope of this invention.

What is claimed is:

1. A gripper assembly comprising
   a tubular housing having a central axis,
   a piston adapted to move inside said tubular housing along said central axis, and a finger assembly supported inside said tubular housing rotatably around said central axis, said finger assembly including a push rod which is pressed rotatably against said piston in the direction of said central axis by biasing means and a plurality of elongated gripping fingers rotatably supported by said finger assembly, a sloped upper surface in contact with said push rod such that a movement of said push rod against said biasing means causes lower ends of said gripping fingers to move towards each other.

2. The gripper assembly of claim 1 further comprising an optical sensor and a fiber optic light guide connected to said optical sensor, said light guide passing through central holes of said piston and said push rod and reaching a position near said lower ends of said gripper fingers.

3. The gripper assembly of claim 1 further comprising a thrust bearing between said piston and said push rod.

* * * * *